United States Patent
Purushothaman et al.

(10) Patent No.: US 11,743,156 B2
(45) Date of Patent: Aug. 29, 2023

(54) SYSTEM FOR PERFORMING DYNAMIC MONITORING AND FILTRATION OF DATA PACKETS

(71) Applicant: BANK OF AMERICA CORPORATION, Charlotte, NC (US)

(72) Inventors: Sasidhar Purushothaman, Telangana (IN); Sravan Kumar Kommu, Telangana (IN); Ramkumar Masilamani, Tamil Nadu (IN); Ramaiah Muvvala, Telangana (IN); Sajid A. Shah, Telangana (IN); Manohar Reddy Singamareddy, Telangana (IN); Srikanth Vemula, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/222,502

(22) Filed: Apr. 5, 2021

(65) Prior Publication Data
US 2022/0321437 A1   Oct. 6, 2022

(51) Int. Cl.
*H04L 43/08* (2022.01)
*H04L 12/54* (2022.01)
*H04L 9/40* (2022.01)

(52) U.S. Cl.
CPC .............. *H04L 43/08* (2013.01); *H04L 12/56* (2013.01); *H04L 63/0245* (2013.01); *H04L 63/10* (2013.01)

(58) Field of Classification Search
CPC ..... H04L 43/08; H04L 12/56; H04L 63/0245; H04L 63/10
See application file for complete search history.

(56) References Cited

U.S. PATENT DOCUMENTS

| | | | |
|---|---|---|---|
| 8,443,434 B1 | 5/2013 | Zuk | |
| 11,356,274 B2 * | 6/2022 | Yu | H04L 9/50 |
| 2008/0219162 A1 * | 9/2008 | Akyol | H04L 47/31 |
| | | | 370/252 |
| 2008/0276297 A1 * | 11/2008 | Shay | H04L 63/0236 |
| | | | 726/1 |
| 2008/0318548 A1 * | 12/2008 | Bravo | H04L 63/18 |
| | | | 455/411 |
| 2010/0095367 A1 * | 4/2010 | Narayanaswamy | |
| | | | H04L 63/0254 |
| | | | 726/12 |
| 2011/0154327 A1 * | 6/2011 | Kozat | G06F 9/5055 |
| | | | 718/1 |
| 2012/0134497 A1 * | 5/2012 | Roitshtein | H04L 49/50 |
| | | | 380/259 |
| 2013/0036470 A1 | 2/2013 | Zhu et al. | |

(Continued)

*Primary Examiner* — Ramy M Osman
(74) *Attorney, Agent, or Firm* — Moore & Van Allen PLLC; Nicholas C. Russell (57) ABSTRACT

Embodiments of the present invention provide a system for dynamically monitoring and filtering data packets associated with accessing one or more entity resources. The system is configured for identifying a data packet in a network comprising at least one data unit, determining that the data packet is attempting to access an entity resource, determining if the at least one data unit of the data packet comprises a signature bit, and allowing or denying the at least one data unit in the data packet to access the entity resource based on determining if the at least one unit comprises the signature bit.

17 Claims, 9 Drawing Sheets

(56) References Cited

U.S. PATENT DOCUMENTS

| | | | |
|---|---|---|---|
| 2014/0143855 A1* | 5/2014 | Keoh | H04L 63/166 |
| | | | 726/14 |
| 2015/0007317 A1 | 1/2015 | Jain | |
| 2015/0156023 A1* | 6/2015 | Hyun | H04L 9/3247 |
| | | | 713/168 |
| 2017/0126679 A1* | 5/2017 | Fredriksson | H04L 63/123 |
| 2017/0353440 A1* | 12/2017 | Murakami | H04L 9/3242 |
| 2020/0162431 A1* | 5/2020 | Goldschlag | H04L 67/20 |
| 2021/0243161 A1* | 8/2021 | Schibuk | H04L 63/145 |
| 2021/0266346 A1 | 8/2021 | Gordon et al. | |
| 2021/0409388 A1* | 12/2021 | Batcher | H04L 63/08 |
| 2022/0182361 A1* | 6/2022 | Hayashi | H04L 63/0236 |
| 2022/0321474 A1* | 10/2022 | Purushothaman | H04L 63/0245 |

\* cited by examiner

SYSTEM FOR PERFORMING DYNAMIC MONITORING AND FILTRATION OF DATA PACKETS

BACKGROUND

Conventional systems do not have the capability to dynamically control access to one or more entity resources associated with an entity. As such, there exists a need for a system that dynamically monitor, filter, and prioritize data packets that are associated with accessing the one or more entity resources of an entity.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically monitoring, filtering, and prioritizing data packets associated with accessing one or more entity resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies a data packet in a network comprising at least one data unit, determines that the data packet is attempting to access an entity resource, determines if the at least one data unit of the data packet comprises a signature bit and allows or denies the at least one data unit in the data packet to access the entity resource based on determining if the at least one unit comprises the signature bit.

In some embodiments, the present invention determines that the at least one data unit comprises the signature bit and allows the at least one data unit to access the entity resource based on determining that the at least one data unit comprises the signature bit.

In some embodiments, the present invention determines that the at least one data unit does not comprise the signature bit and denies the at least one data unit from accessing the entity resource, wherein denying comprises attenuating the at least one data unit that does not comprise the signature bit from the data packet.

In some embodiments, the present invention generates the signature bit for the at least one data unit in the data packet in response to identifying the data packet in the network at a first instance.

In some embodiments, the signature bit comprises at least one of prioritization weight, data source information, and category of data in the at least one data unit of the data packet.

In some embodiments, the category of the data is determined based on classifying data in the at least one data unit, wherein classifying the data comprises determining whether the data is intrinsic data or derived data, determining whether the data is numeric data or non-numeric data, determining type of the data, and determining whether the data is structured data, semi-structured data, or non-structured data.

In some embodiments, the present invention continuously and dynamically modifies the data source information in the signature bit based on traversal path of the data packet within the network.

In some embodiments, the present invention identifies a data packet in a network comprising at least a first data unit and a second data unit, determines that the first data unit and the second data unit of the data packet are attempting to access an entity resource, determines that first data associated with the first data unit and second data associated with the second data unit cannot access the entity resource at a same instance based on a first signature bit associated with the first data unit and a second signature bit associated with the second data unit, attenuates the first data unit or the second data unit from the data packet based on the first signature bit and the second signature bit, and allows the data packet without the first data unit or the second data unit to access the entity resource.

In some embodiments, the present invention attenuates the first data unit or the second data based on prioritization weights in the first signature bit and the second signature bit.

In some embodiments, the present invention determines a network congestion event and attenuates one or more data packets based on prioritization weights present in signature bits of the one or more data packets.

In some embodiments, the present invention generates the first signature bit and the signature bit in response to identifying the data packet in the network at a first instance.

In some embodiments, the present invention the first signature bit and the second signature bit comprise at least one of prioritization weight, data source information, and a category.

In some embodiments, the category associated with the first data and the second data is determined based on classifying data in the at least one data unit, wherein classifying the data comprises: determining whether the first data and the second data is intrinsic data or derived data, determining whether the first data and the second data is numeric data or non-numeric data, determining type of the first data and the second data, and determining whether the first data and the second data is structured data, semi-structured data, or non-structured data.

In some embodiments, the present invention continuously and dynamically modifies the data source information in the first signature bit and the second signature bit based on traversal path of the data packet within the network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, an entity may utilize one or more entity resources to perform one or more organizational activities associated with an entity. The one or more entity resources may include, but are not limited to, one or more servers, one or more databases, one or more entity systems, one or more software applications, or the like. Some of the entity resources may comprise highly sensitive and confidential information and/or may process highly sensitive interactions (e.g., sensitive and large scale financial transactions). Bad actors may continuously try to gain unauthorized access to such entity resources by sending or by injecting one or more data packets that mimic the authorized data packets that are from known entity sources (e.g., mimicking a data packet from an entity application 'A,' mimicking a data packet from an entity user, or the like) into data stream or network of the entity, where the one or more data packets can gain access to the one or more entity resources by bypassing the existing security mechanisms set by conventional systems, thereby opening up the entity resources to significant exposures. Therefore, conventional systems do not have the capability to effectively monitor, filter, and prioritize data packets trying to access the one or more entity resources. As such, there exists a need for a system to dynamically monitor, filter, and prioritize data packets trying to access the one or more entity resources.

Figure 1:
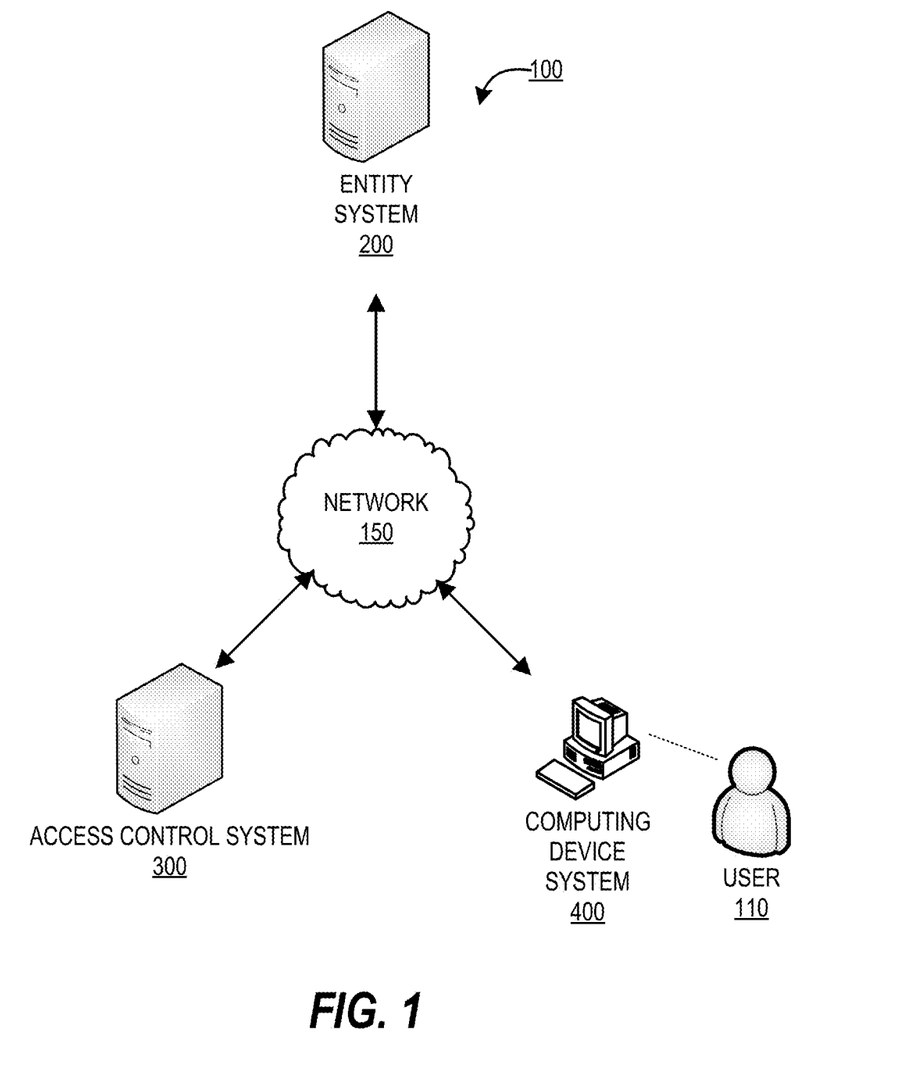
FIG. 1 provides a block diagram illustrating a system environment for dynamically monitoring, filtering, and prioritizing data packets associated with accessing one or more entity resources, in accordance with an embodiment of the invention.

FIG. 1 provides a block diagram illustrating a system environment 100 for dynamically monitoring, filtering, and prioritizing data packets associated with accessing one or more entity resources, in accordance with an embodiment of the invention. As illustrated in FIG. 1, the environment 100 includes an access control system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The access control system 300 is a system of the present invention for performing one or more process steps described herein. In some embodiments, the access control system 300 may be an independent system. In some embodiments, the access control system 300 may be a part of the entity system 200.

The access control system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the access control system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the access control system 300, and/or entity system 200 across the network 150.

Figure 2:
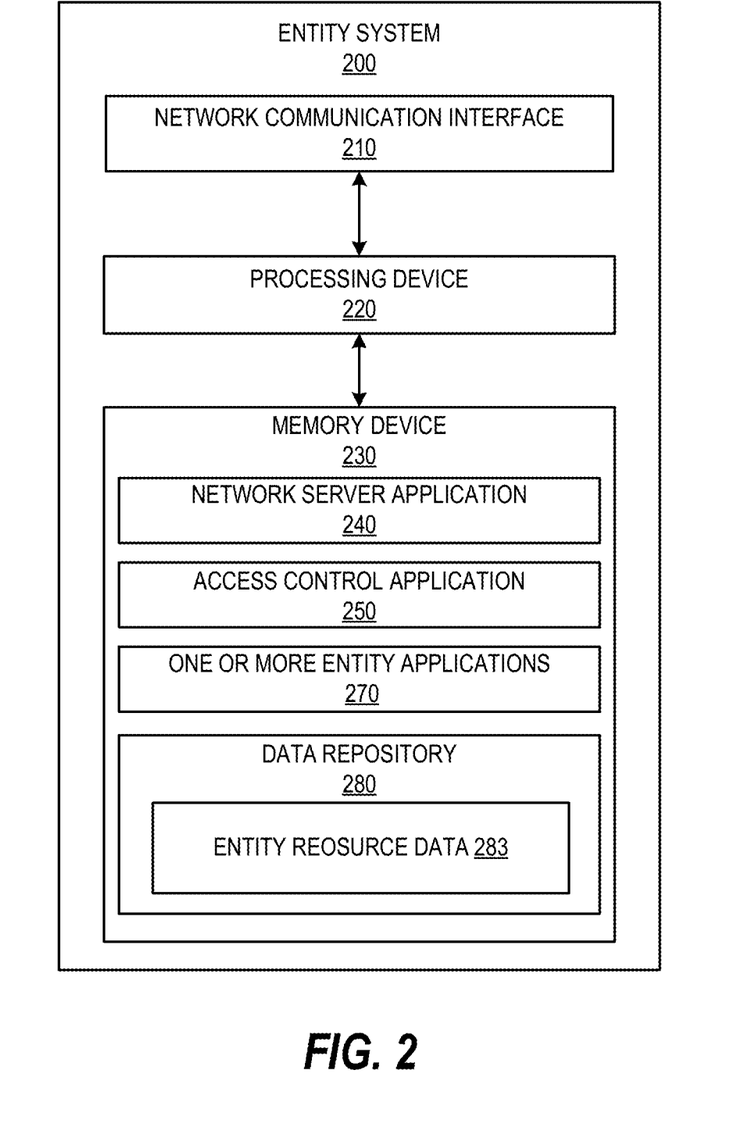
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an access control application 250, one or more entity applications 270, and a data repository 280 comprising information associated with entity resource data 283. The one or more entity application 270 may be any applications developed, supported, maintained, utilized, and/or controlled by the entity. Entity resource data 283 may comprise any data (e.g., prioritization data, known data sources and known types of data allowed to access the one or more entity resources) associated with the one or more entity resources of the entity. The computer-executable program code of the network server application 240, the access control application 250, the one or more entity application 270 to perform certain logic, data-extraction, and data-storing functions of the entity system 200 described herein, as well as communication functions of the entity system 200.

The network server application 240, the access control application 250, and the one or more entity applications 270 are configured to store data in the data repository 280 or to use the data stored in the data repository 280 when communicating through the network communication interface 210 with the access control system 300, and/or the computing device system 400 to perform one or more process steps described herein. In some embodiments, the entity system 200 may receive instructions from the access control system 300 via the access control application 250 to perform certain operations. The access control application 250 may be provided by the access control system 300. The one or more entity applications 270 may be any of the applications used, created, modified, facilitated, and/or managed by the entity system 200.

Figure 3:
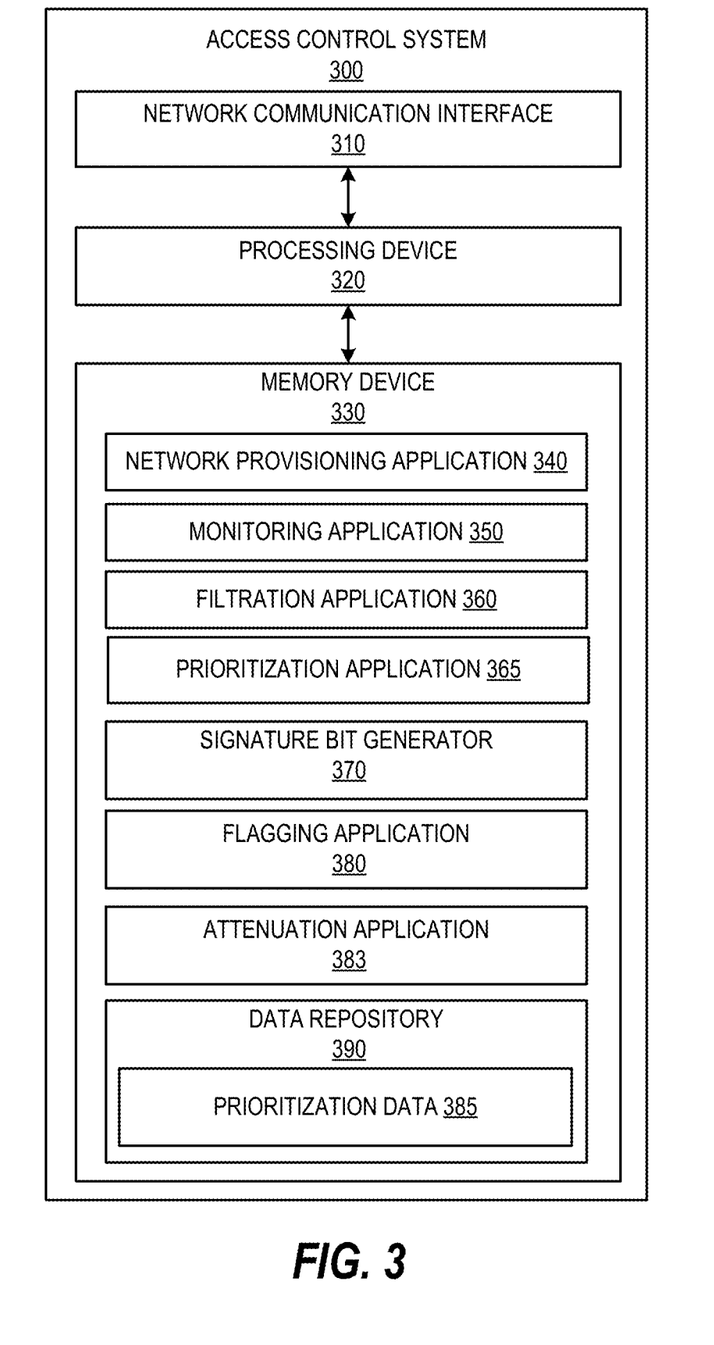
FIG. 3 provides a block diagram illustrating an access control system 300 of FIG. 1, in accordance with an embodiment of the invention.

FIG. 3 provides a block diagram illustrating the access control system 300 in greater detail, in accordance with embodiments of the invention. As illustrated in FIG. 3, in one embodiment of the invention, the access control system 300 includes one or more processing devices 320 operatively coupled to a network communication interface 310 and a memory device 330. In certain embodiments, the access control system 300 is operated by an entity, such as a financial institution. In some embodiments, the access control system 300 is owned or operated by the entity of the entity system 200. In some embodiments, the access control system 300 may be an independent system. In alternate embodiments, the access control system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the access control system 300 described herein. For example, in one embodiment of the access control system 300, the memory device 330 includes, but is not limited to, a network provisioning application 340, a monitoring application 350, a filtration application 360, a prioritization application 365, a signature bit generator 370, a flagging application 380, an attenuation application 383, and a data repository 390 comprising prioritization data 385 and any other data processed or accessed by one or more applications in the memory device 330. The computer-executable program code of the network provisioning application 340, the monitoring application 350, the filtration application 360, the prioritization application 365, the signature bit generator 370, the flagging application 380, and the attenuation application 383 may instruct the processing device 320 to perform certain logic, data-processing, and data-storing functions of the access control system 300 described herein, as well as communication functions of the access control system 300.

The network provisioning application 340, the monitoring application 350, the filtration application 360, the prioritization application 365, the signature bit generator 370, the flagging application 380, and the attenuation application 383 are configured to invoke or use the data in the data repository 390 when communicating through the network communication interface 310 with the entity system 200, and/or the computing device system 400. In some embodiments, the network provisioning application 340, the monitoring application 350, the filtration application 360, the prioritization application 365, the signature bit generator 370, the flagging application 380, and the attenuation application 383 may store the data extracted or received from the entity system 200, and the computing device system 400 in the data repository 390. In some embodiments, the network provisioning application 340, the monitoring application 350, the filtration application 360, the prioritization application 365, the signature bit generator 370, the flagging application 380, and the attenuation application 383 may be a part of a single application.

The network provisioning application 340 allows the access control system to send and/or receive one or more communications associated with the process flow described herein. The monitoring application 350 may monitor one or more data packets within the data stream of the entity. The filtration application 360 filters unauthorized data packets. The prioritization application 365 prioritized one or more data packets. The signature bit generator 370 generates signature bits for embedding into them into the one or more data packets. The flagging application 380 flags one or more data packets that are not to be combined. The attenuation application 383 attenuates data packets that are filtered by filtration application 360 and/or data packets flagged by the flagging application 380.

Figure 4:
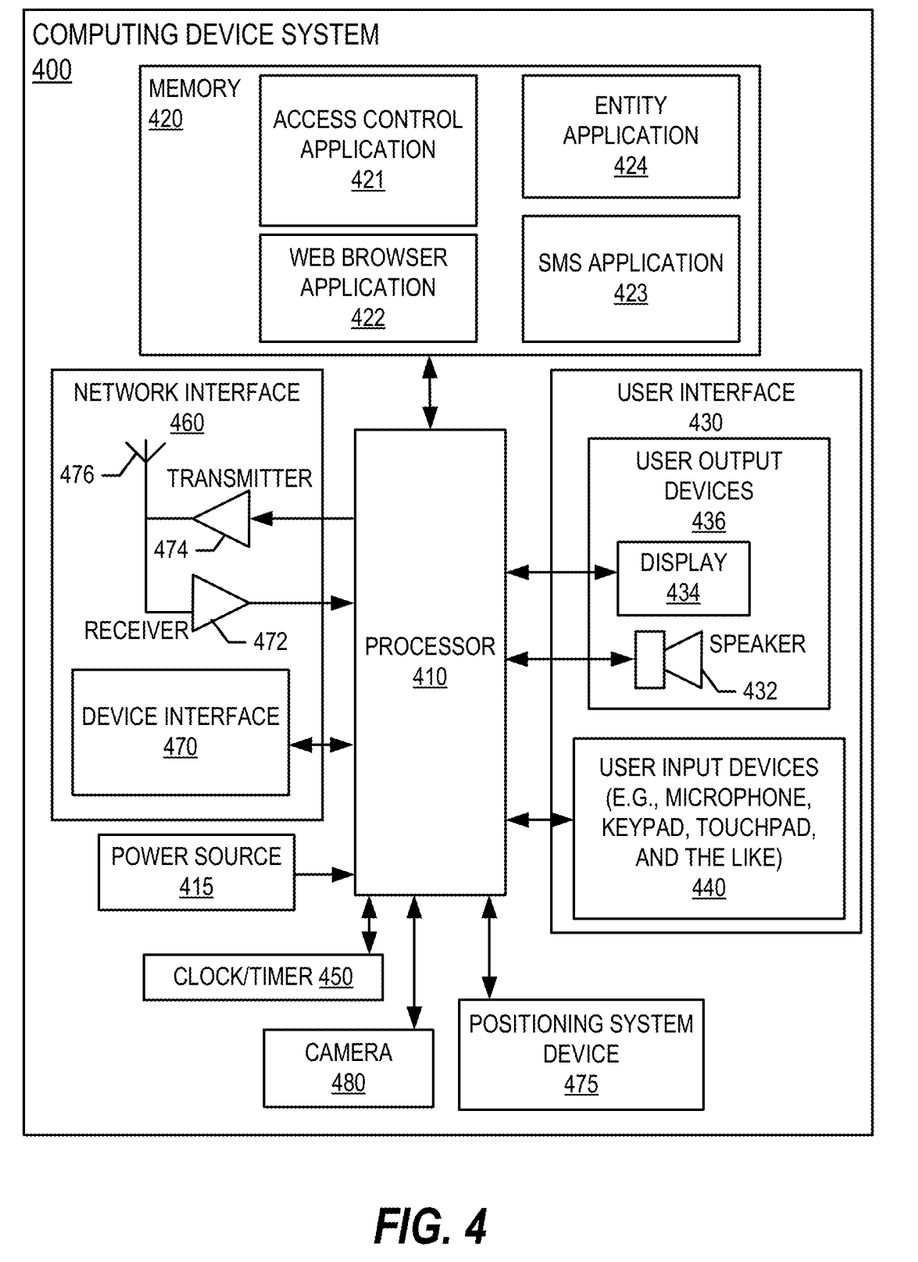
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an access control application 421, entity application 424. These applications also typically instructions to a graphical user interface (GUI) on the display 430 that allows the user 110 to interact with the entity system 200, the access control system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the access control application 421 provided by the access control system 300 allows the user 110 to access the access control system 300. In some embodiments, the entity application 424 provided by the entity system 200 and the access control application 421 allow the user 110 to access the functionalities provided by the access control system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
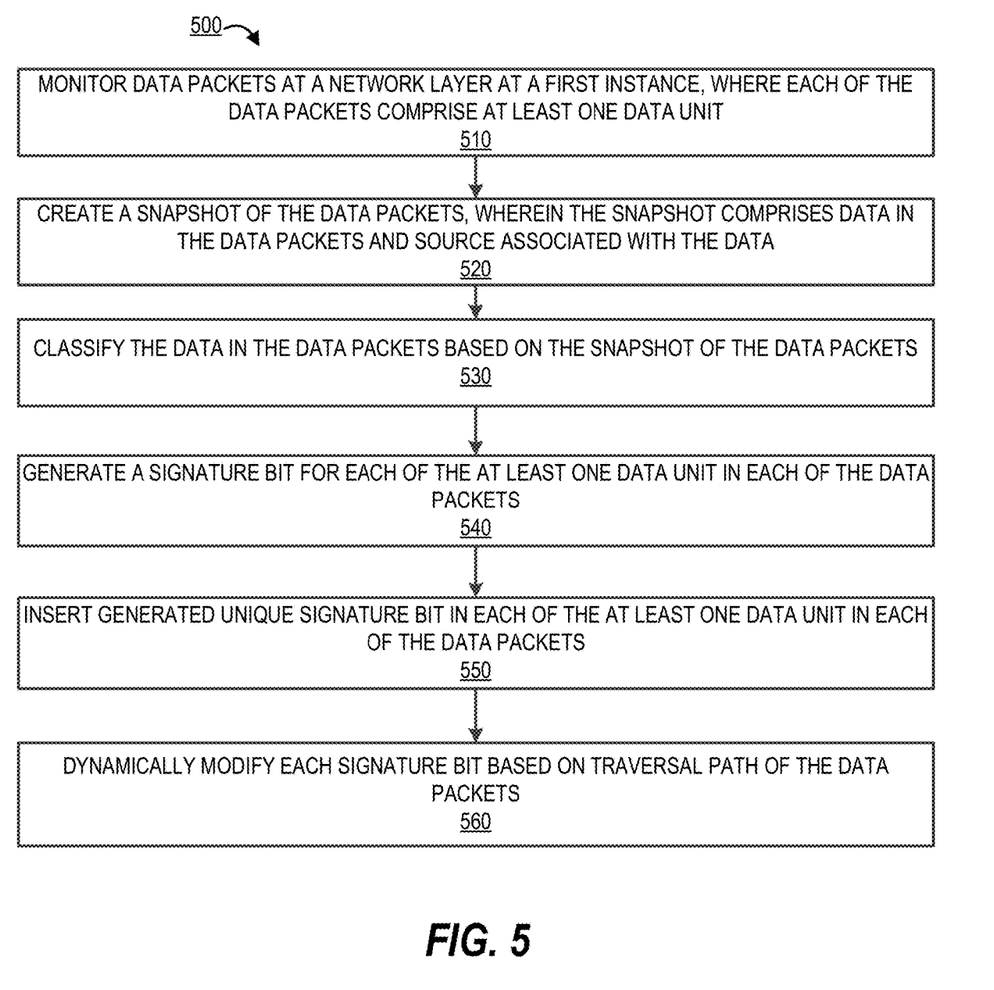
FIG. 5 provides a flowchart illustrating a process flow for generating signature bits associated with data packets in a network, in accordance with an embodiment of the invention.
Figure 7A:
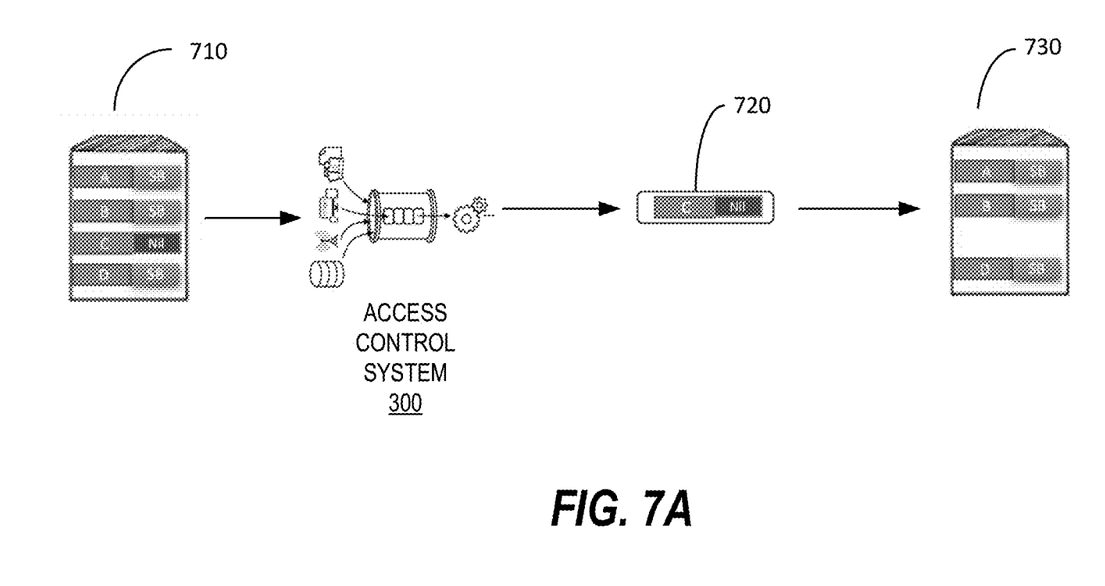
FIG. 7A provides a block diagram illustrating the process flow for dynamically monitoring and filtering data packets associated with accessing the one or more entity resources, in accordance with an embodiment of the invention.
Figure 7B:
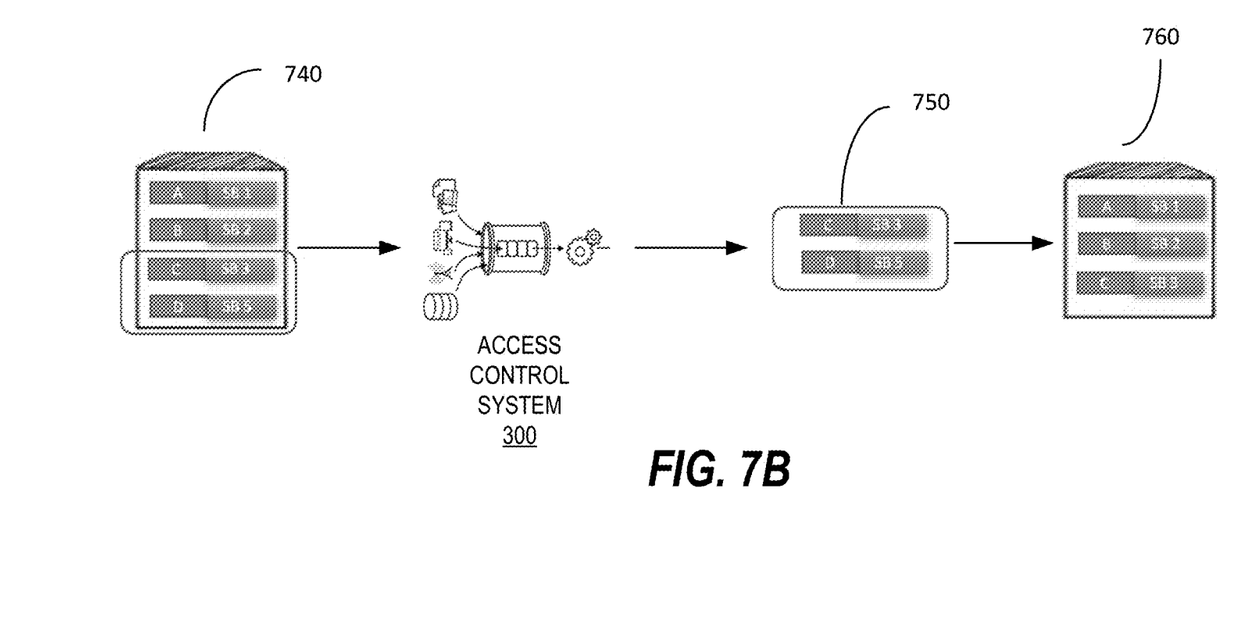
FIG. 7B provides a block diagram illustrating the process flow for dynamically monitoring and prioritizing data packets associated with accessing the one or more entity resources, in accordance with an embodiment of the invention.

FIG. 5 provides a flowchart illustrating a process flow for generating signature bits associated with data packets in a network, in accordance with an embodiment of the invention. As shown in block 510, the system monitors data packets at a network layer at a first instance, where each of the data packets comprise at least one data unit. In some embodiments, the data packets may comprise more than one data units as shown in FIG. 7A and FIG. 7B. In some embodiments, each of the more than one data units may be coming from a difference data source or an entity resource. For example, a first data unit may be coming from a first application located in a first server, a second data unit may be coming from a second application located in the first server, and a third data unit may be coming from a third application located in a second server. In some embodiments, at least one unit of the more than one data units may be coming from an external data source that is external to the entity (e.g., a third party server).

As shown in block 520, the system creates a snapshot of the data packets, wherein the snapshot comprises a copy of data in the data packets and source associated with the data packets. The snapshot of the data in each of the data units in the data packets and source associated with each of the data units is captured.

As shown in block 530, the system classifies the data in the data packets based on the snapshot of the data packets. The system may determine a category of the data in the data packets based on classifying the data. In some embodiments, classification of the data in the data packets comprises determining whether the data is intrinsic data or derived data, determining whether the data is numeric data or non-numeric data, determining type of the data (e.g., raw data, metadata, or the like), and determining whether the data is structured data, semi-structured data, or non-structured data. In some embodiments, classification of the data may further comprise determining a file type of the at least one data unit (e.g., document, image, or the like).

As shown in block 540, the system generates a signature bit for each of the at least one data unit in each of the data packets. The signature bit comprises at least one of prioritization weights, data source that is captured in block 520, and the category of the data determined in block 530. In some embodiments, the system determines prioritization weight of a data unit by communicating with a data source associated with the data unit. Each of the signature bits that are generated for each of the data units within the data packets may be different. For example, first data in a first data unit of a data packet may be intrinsic data comprising non-numeric structured data and the type of the first data may be raw data, where the first data unit may be from an external data source. Second data in a second data unit of the data packet may be derived data comprising numeric semi-structured data and the type of the second data may be metadata, where the second data unit may be coming from a first application in an internal entity serve 'A.' In some embodiments, the signature bits generated by the system may follow a specific format, where the specific format may be changed by the system from time to time. As shown in block 550, the system inserts the generated unique signature bit in each of the at least one data unit in each of the data packets.

As shown in block 560, the system dynamically modifies the signature bit based on traversal path of the data packet. For example, a signature bit that was generated after a first data unit has passed a first data source is modified once the system determines that the first data unit has progressed to a second data source. The system continuously monitors and tracks the data units and dynamically modifies the signature bits based on the traversal path associated with each of the data units.

Figure 6A:
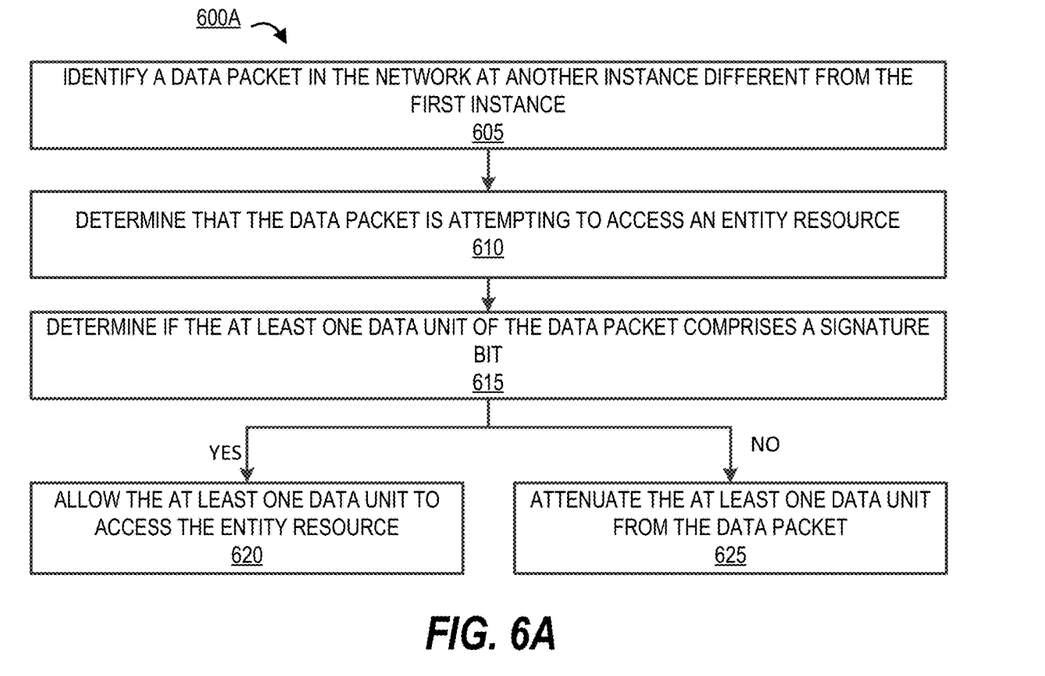
FIG. 6A provides a flowchart illustrating a process flow for dynamically monitoring and filtering data packets associated with accessing one or more entity resources, in accordance with an embodiment of the invention.

FIG. 6A provides a flowchart illustrating a process flow for dynamically monitoring and filtering data packets associated with accessing one or more entity resources, in accordance with an embodiment of the invention.

As shown in block 605, the system identifies a data packet in the network at another instance different from the first instance. As shown in block 610, the system determines that the data packet is attempting to access an entity resource. At the first instance (e.g., when the system identifies a data packet for the first time), the system generates the signature bit. At a second instance, the system may identify that the same data packet is trying to access an entity resource.

As shown in block 615, the system determines if the at least one data unit of the data packet comprises a signature bit. If the at least one data unit comprises the signature bit, the process flow moves to block 620. If the at least one data unit does not comprise the signature bit, the process flow moves to block 625. As shown in block 620, in response to determining that the at least one data unit comprises the signature bit, the system allows the at least one data unit to access the entity resource. As shown in block 625, the system in response to determining that the at least one data unit does not comprise the signature bit attenuates the at least one data unit from the data packet. In some embodiments, the system may attenuate the at least one data unit that does not comprise the data packet and may allow other data units in the data packet to pass through as illustrated in FIG. 7A. FIG. 7A provides a block diagram illustrating the process flow for dynamically monitoring and filtering data packets associated with accessing the one or more entity resources, in accordance with an embodiment of the invention. As shown, a data packet 710 may comprise a data unit 'A,' a data unit 'B,' a data unit 'C,' and a data unit 'D.' Upon detecting the data packet 710 at a second instance, the access control system 300 determines whether each of the data units within the data packet 710 comprise a signature bit. As shown in block 720, the system may determine that the data unit 'C' does not comprise a signature bit and flags the data unit 'C' and queues the data unit 'C' for attenuation. After attenuating the data unit 'C,' the control access system 300 allows the data packet 710 that now comprises data unit 'A,' data unit 'B,' and data unit 'D' to access an entity resource as shown in block 730, thereby preventing any unauthorized data units to access the entity resource.

Figure 6B:
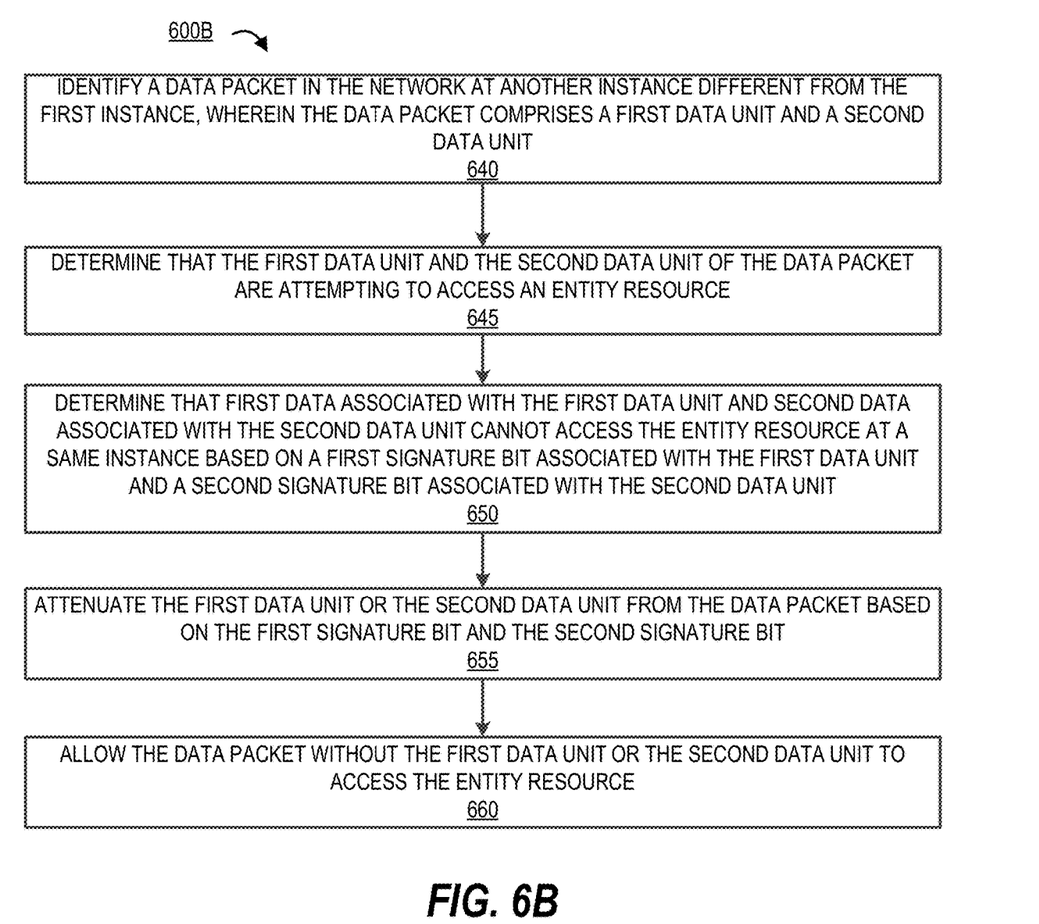
FIG. 6B provides a flowchart illustrating a process flow for dynamically monitoring and prioritizing data packets associated with accessing one or more entity resources, in accordance with an embodiment of the invention.

FIG. 6B provides a flowchart illustrating a process flow for dynamically monitoring and prioritizing data packets associated with accessing one or more entity resources, in accordance with an embodiment of the invention.

As shown in block 640, the system identifies a data packet in the network at another instance different from the first instance, wherein the data packet comprises a first data unit and a second data unit. In some embodiments, the data packet may comprise more than one data units as illustrated in FIG. 7B. As shown in block 645, the system determines that the first data unit and the second data unit of the data packet are attempting to access an entity resource.

As shown in block 650, the system determines that first data associated with the first data unit and second data associated with the second data unit cannot access the entity resource at a same instance based on a first signature bit associated with the first data unit and a second signature bit associated with the second data unit. The first signature bit and the second signature bit may comprise information associated with accessing a particular entity resource and information associated with which data unit the first data unit and the second data unit should not be combined.

As shown in block 655, the system attenuates the first data unit or the second data unit from the data packet based on the first signature bit and the second signature bit. The system may perform attenuation based on prioritization weights present in the first data unit and the second data unit. For example, the system may attenuate the first data unit if prioritization weight of the first data unit is lower than prioritization weight of the second data unit.

As shown in block 660, the system allows the data packet without the first data unit or the second data unit to access the entity resource as illustrated in FIG. 7B. FIG. 7B provides a block diagram illustrating the process flow for dynamically monitoring and prioritizing data packets associated with accessing the one or more entity resources, in accordance with an embodiment of the invention. As shown, a data packet 740 may comprise a data unit 'A,' a data unit 'B,' a data unit 'C,' and a data unit 'D.' Upon detecting the data packet 740 at a second instance, the system determines based on the information in a signature bit associated with data unit 'C' and a signature bit associated with data unit 'D' that data in data unit 'C' cannot be combined with data unit 'D' as shown in block 750. In other words, data in data unit 'C' cannot be combined with data in data unit 'D' while going into the entity resource (e.g., may be because of security related issues and/or business rules). The system then attenuates data unit 'D' based on prioritization weights present in signature bits of data unit 'C' and data unit 'D' and allows the data packet 740 without the data unit 'D' to access the entity application as shown in block 760.

In a case where there is a network congestion in the network, conventional systems typically purge all the data units and data packets that are present in the network to relieve network congestion. In such cases of the network congestion, the system instead of purging all the data units and data packets, purges only some data units based on the prioritization weights present in the signature bits of the data units.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically monitoring and filtering data packets associated with accessing one or more entity resources, the system comprising:
   at least one network communication interface;
   at least one non-transitory storage device; and
   at least one processing device coupled to the at least one non-transitory storage device and the at least one network communication interface, wherein the at least one processing device is configured to:
      monitor one or more data packets at a network layer;
      identify a data packet in a network comprising at least one data unit at a first instance based on monitoring the one or more data packets at the network layer, wherein the at least one data unit is from a first application located in a first server and at least one other data unit is from a second application located in a second server;
      generate a unique signature bit for the data packet based on identifying the data packet in the network at the first instance, wherein the unique signature bit comprises at least one of prioritization weight, data source information, and category of data in the at least one data unit of the data packet;
      insert the unique signature bit to the at least one data unit within the data packet;
      continue monitoring the one or more data packets at the network layer;
      identify the data packet in the network at another instance different from the first instance;
      determine that the data packet is attempting to access an entity resource;
      determine if the at least one data unit of the data packet comprises the unique signature bit;
      allow or deny the at least one data unit in the data packet to access the entity resource based on determining if the at least one unit comprises the unique signature bit;
      identify a first data unit and a second data unit from the data packet based on a first signature bit and a second signature bit;
      perform an attenuation of the data packet based on prioritization weights present in the first data unit and the second data unit, wherein performing an attenuation of the data packet comprises:
         identifying a prioritization weight of the first data unit is lower than prioritization weight of the second data unit, and allowing the data packet to access the entity resource without the first data unit.

2. The system of claim 1, wherein the at least one processing device is configured to:
   determine that the at least one data unit comprises the unique signature bit; and
   allow the at least one data unit to access the entity resource based on determining that the at least one data unit comprises the unique signature bit.

3. The system of claim 1, wherein the at least one processing device is configured to:
   determine that the at least one data unit does not comprise the unique signature bit; and
   deny the at least one data unit from accessing the entity resource, wherein denying comprises attenuating the at least one data unit that does not comprise the unique signature bit from the data packet.

4. The system of claim 1, wherein the at least one processing device is configured to:
   create a snapshot of the data packet, wherein the snapshot comprises a copy of the data in the data packet and a source associated with the data packet.

5. The system of claim 4, wherein the category of the data is determined based on the snapshot comprising the copy of the data and the source, wherein determining the category of the data comprises:
   determining whether the data is intrinsic data or derived data;
   determining whether the data is numeric data or non-numeric data;
   determining whether the data is raw data, processed data, or metadata; and
   determining whether the data is structured data, semi-structured data, or non-structured data.

6. The system of claim 1, wherein the at least one processing device is configured to continuously and dynamically modify the data source information in the unique signature bit based on traversal path of the data packet within the network.

7. A computer program product for dynamically monitoring and filtering data packets associated with accessing one or more entity resources, the computer program product comprising a non-transitory computer-readable storage medium having computer executable instructions for causing a computer processor to perform the steps of:
   monitoring one or more data packets at a network layer;
   identifying a data packet in a network comprising at least one data unit at a first instance based on monitoring the one or more data packets at the network layer, wherein the at least one data unit is from a first application located in a first server and at least one other data unit is from a second application located in a second server;
   generating a unique signature bit for the data packet based on identifying the data packet in the network at the first instance, wherein the unique signature bit comprises at least one of prioritization weight, data source information, and category of data in the at least one data unit of the data packet;
   inserting the unique signature bit to the at least one data unit within the data packet;
   continuing to monitor the one or more data packets at the network layer;
   identifying the data packet in the network at another instance different from the first instance;
   determining that the data packet is attempting to access an entity resource;
   determining if the at least one data unit of the data packet comprises the unique signature bit;
   allowing or denying the at least one data unit in the data packet to access the entity resource based on determining if the at least one unit comprises the unique signature bit;
   identifying a first data unit and a second data unit from the data packet based on a first signature bit and a second signature bit;
   performing an attenuation of the data packet based on prioritization weights present in the first data unit and the second data unit, wherein performing an attenuation of the data packet comprises:
      identifying a prioritization weight of the first data unit is lower than prioritization weight of the second data unit, and
      allowing the data packet to access the entity resource without the first data unit.

8. The computer program product of claim 7, wherein the computer executable instructions cause the computer processor to perform the steps of:
   determining that the at least one data unit comprises the unique signature bit; and
   allowing the at least one data unit to access the entity resource based on determining that the at least one data unit comprises the unique signature bit.

9. The computer program product of claim 7, wherein the computer executable instructions cause the computer processor to perform the steps of:
   determining that the at least one data unit does not comprise the unique signature bit; and
   denying the at least one data unit from accessing the entity resource, wherein denying comprises attenuating the at least one data unit that does not comprise the unique signature bit from the data packet.

10. The computer program product of claim 7, wherein the computer executable instructions cause the computer processor to perform the steps of creating a snapshot of the data packet, wherein the snapshot comprises a copy of the data in the data packet and a source associated with the data packet.

11. The computer program product of claim 10, wherein the category of the data is determined based on the snapshot comprising the copy of the data and the source, wherein determining the category of the data comprises:
   determining whether the data is intrinsic data or derived data;
   determining whether the data is numeric data or non-numeric data;
   determining whether the data is raw data, processed data, or metadata; and
   determining whether the data is structured data, semi-structured data, or non-structured data.

12. The computer program product of claim 7, wherein the computer executable instructions cause the computer processor to perform the steps of continuously and dynamically modifying the data source information in the unique signature bit based on traversal path of the data packet within the network.

13. A computer implemented method for dynamically monitoring and filtering data packets associated with accessing one or more entity resources, wherein the method comprises:
   monitoring one or more data packets at a network layer;
   identifying a data packet in a network comprising at least one data unit at a first instance based on monitoring the one or more data packets at the network layer, wherein the at least one data unit is from a first application located in a first server and at least one other data unit is from a second application located in a second server;

generating a unique signature bit for the data packet based on identifying the data packet in the network at the first instance, wherein the unique signature bit comprises at least one of prioritization weight, data source information, and category of data in the at least one data unit of the data packet;

inserting the unique signature bit to the at least one data unit within the data packet;

continuing to monitor the one or more data packets at the network layer;

identifying the data packet in the network at another instance different from the first instance;

determining that the data packet is attempting to access an entity resource;

determining if the at least one data unit of the data packet comprises the unique signature bit;

allowing or denying the at least one data unit in the data packet to access the entity resource based on determining if the at least one unit comprises the unique signature bit;

identifying a first data unit and a second data unit from the data packet based on a first signature bit and a second signature bit;

performing an attenuation of the data packet based on prioritization weights present in the first data unit and the second data unit, wherein performing an attenuation of the data packet comprises:

identifying a prioritization weight of the first data unit is lower than prioritization weight of the second data unit, and allowing the data packet to access the entity resource without the first data unit.

14. The computer implemented method of claim 13, wherein the method comprises:

determining that the at least one data unit comprises the unique signature bit; and allowing the at least one data unit to access the entity resource based on determining that the at least one data unit comprises the unique signature bit.

15. The computer implemented method of claim 13, wherein the method comprises:

determining that the at least one data unit does not comprise the unique signature bit; and denying the at least one data unit from accessing the entity resource, wherein denying comprises attenuating the at least one data unit that does not comprise the unique signature bit from the data packet.

16. The computer implemented method of claim 13, wherein the method further comprises: creating a snapshot of the data packet, wherein the snapshot comprises a copy of the data in the data packet and a source associated with the data packet.

17. The computer implemented method of claim 13, wherein method comprises continuously and dynamically modifying the data source information in the unique signature bit based on traversal path of the data packet within the network.

* * * * *